(12) United States Patent
Falconer et al.

(10) Patent No.: US 10,562,403 B2
(45) Date of Patent: Feb. 18, 2020

(54) ELECTRIFIED VEHICLES EQUIPPED WITH RANGE EXTENDING SECONDARY BATTERY PACKS

(71) Applicant: FORD GLOBAL TECHNOLOGIES, LLC, Dearborn, MI (US)

(72) Inventors: William Falconer, Detroit, MI (US); Charles R. Boardman, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/934,037

(22) Filed: Mar. 23, 2018

(65) Prior Publication Data

US 2019/0291587 A1    Sep. 26, 2019

(51) Int. Cl.
| | |
|---|---|
| *B60L 11/18* | (2006.01) |
| *B60L 53/14* | (2019.01) |
| *H01M 2/10* | (2006.01) |
| *H01M 10/625* | (2014.01) |
| *B60L 50/60* | (2019.01) |
| *B60L 50/64* | (2019.01) |

(52) U.S. Cl.
CPC .............. *B60L 53/14* (2019.02); *B60L 50/64* (2019.02); *B60L 50/66* (2019.02); *H01M 2/1077* (2013.01); *H01M 10/625* (2015.04)

(58) Field of Classification Search
CPC ..................... B60L 11/1877; B60L 11/1879
See application file for complete search history.

(56) References Cited

U.S. PATENT DOCUMENTS

| | | | |
|---|---|---|---|
| 6,571,949 B2 | 6/2003 | Burrus, IV et al. | |
| 6,596,941 B2 | 7/2003 | Tripoli | |
| 8,120,308 B2 | 2/2012 | Ward | |
| 2008/0100258 A1 | 5/2008 | Ward | |
| 2014/0158444 A1* | 6/2014 | Han | B60K 1/04 |
| | | | 180/68.5 |
| 2014/0375272 A1* | 12/2014 | Johnsen | B60L 53/14 |
| | | | 320/136 |
| 2015/0069964 A1* | 3/2015 | Kamikihara | B60L 11/182 |
| | | | 320/108 |
| 2016/0009232 A1 | 1/2016 | Budny | |
| 2016/0176312 A1 | 6/2016 | Duhaime et al. | |
| 2019/0016231 A1* | 1/2019 | Scaringe | B60L 58/26 |

* cited by examiner

*Primary Examiner* — Bryan A Evans
(74) *Attorney, Agent, or Firm* — David B. Kelley; Carlson, Gaskey & Olds

(57) ABSTRACT

This disclosure details electrified vehicles that are equipped with secondary battery packs for increasing the electric range of the vehicles. An exemplary electrified vehicle includes a cargo space, such as a truck bed, and a secondary battery pack positioned within the cargo space. The secondary battery pack is adapted to selectively supply power for propelling one or more vehicle drive wheels. In some embodiments, the secondary battery pack is configured as a floor liner that lines a floor of the cargo space.

16 Claims, 5 Drawing Sheets

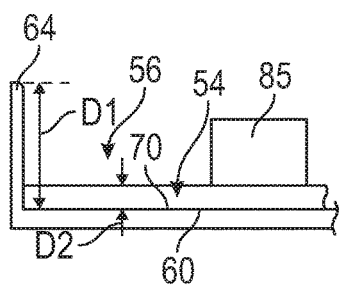
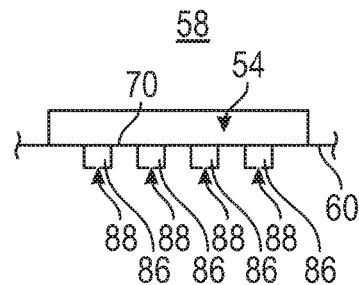
FIG. 3   FIG. 4
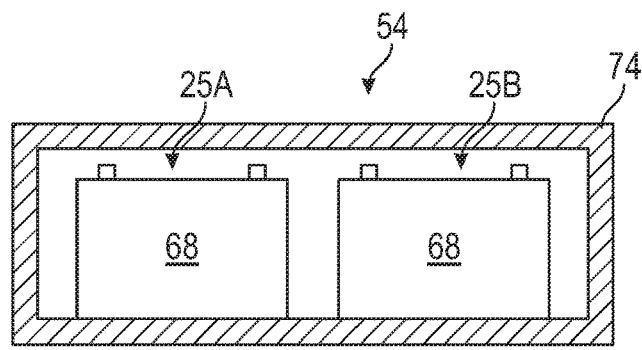
FIG. 5
FIG. 5B
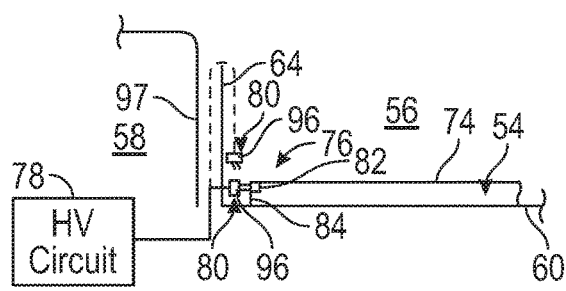
FIG. 6

ELECTRIFIED VEHICLES EQUIPPED WITH RANGE EXTENDING SECONDARY BATTERY PACKS

TECHNICAL FIELD

This disclosure relates to electrified vehicle battery packs, and more particularly to a secondary battery pack that can be positioned within a vehicle cargo space for selectively supplying power for propelling one or more vehicle drive wheels.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The high voltage battery pack provides a limited amount of electric-only driving range. Some customers desire the ability to add additional electric-only range to their electrified vehicles.

SUMMARY

An electrified vehicle according to an exemplary aspect of the present disclosure includes, among other things, a drive wheel, a cargo space, and a secondary battery pack positioned within the cargo space and adapted to selectively supply power for propelling the drive wheel. The secondary battery pack is configured as a floor liner that lines at least a portion of a floor of the cargo space.

In a further non-limiting embodiment of the foregoing electrified vehicle, the electrified vehicle is a pickup truck.

In a further non-limiting embodiment of either of the foregoing electrified vehicles, the cargo space is established by a truck bed of the pickup truck.

In a further non-limiting embodiment of any of the foregoing electrified vehicles, a bottom surface of the secondary battery pack is contiguous with the floor of the cargo space.

In a further non-limiting embodiment of any of the foregoing electrified vehicles, the secondary battery pack includes an enclosure that houses at least one battery array.

In a further non-limiting embodiment of any of the foregoing electrified vehicles, the enclosure is a rigid, waterproof enclosure.

In a further non-limiting embodiment of any of the foregoing electrified vehicles, the vehicle includes a connection system for electrically connecting the secondary battery pack to a high voltage circuit of the electrified vehicle.

In a further non-limiting embodiment of any of the foregoing electrified vehicles, the connection system includes a vehicle-side connector and a battery-side connector.

In a further non-limiting embodiment of any of the foregoing electrified vehicles, the vehicle-side connector includes a flexible plug that extends between a rear wall of a passenger cabin and a front wall of the cargo space.

In a further non-limiting embodiment of any of the foregoing electrified vehicles, the flexible plug extends through the front wall.

In a further non-limiting embodiment of any of the foregoing electrified vehicles, a primary battery pack is adapted to selectively supply power for propelling the drive wheel.

In a further non-limiting embodiment of any of the foregoing electrified vehicles, a second secondary battery pack is positioned over top of the secondary battery pack.

In a further non-limiting embodiment of any of the foregoing electrified vehicles, the secondary battery pack and the second secondary battery pack are received within longitudinal slots formed in longitudinally extending side walls of the cargo space.

In a further non-limiting embodiment of any of the foregoing electrified vehicles, the cargo space includes a first depth and the secondary battery pack includes a second depth that is shallower than the first depth.

In a further non-limiting embodiment of any of the foregoing electrified vehicles, the floor of the cargo space includes a channel configured to communicate a cooling airflow between a bottom surface of the secondary battery pack and the floor.

A method according to another exemplary aspect of the present disclosure includes, among other things, lining a floor of a cargo space of an electrified vehicle with a secondary battery pack that is configured as a floor liner, and selectively propelling a wheel of the electrified vehicle using power from the secondary battery pack.

In a further non-limiting embodiment of the foregoing method, the method includes selectively propelling the wheel of the electrified vehicle using power from a primary battery pack of the electrified vehicle.

In a further non-limiting embodiment of either of the foregoing methods, selectively propelling the wheel using power from the secondary battery pack is only performed when a state of charge of a primary battery pack of the electrified vehicle falls below a threshold level.

In a further non-limiting embodiment of any of the foregoing methods, lining the floor of the cargo space includes sliding the secondary battery pack within longitudinal slots formed in longitudinally extending side walls of the cargo space.

In a further non-limiting embodiment of any of the foregoing methods, the method includes positioning a second secondary battery pack over top of the secondary battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 3 and 4 schematically illustrate the secondary battery pack of FIG. 2 received against a cargo space floor of the electrified vehicle of FIG. 2.

FIG. 5 is a cross-sectional view through section 5-5 of the secondary battery pack of FIG. 2.

FIG. 5B illustrates a battery array of the secondary battery pack of FIGS. 2 and 5.

FIG. 6 illustrates a connection system for connecting a secondary battery pack to a high voltage circuit of an electrified vehicle according to an embodiment of this disclosure.

DETAILED DESCRIPTION

This disclosure details electrified vehicles that are equipped with secondary battery packs for increasing the electric range of the vehicles. An exemplary electrified vehicle includes a cargo space, such as a truck bed, and a secondary battery pack positioned within the cargo space. The secondary battery pack is adapted to selectively supply power for propelling one or more vehicle drive wheels. In some embodiments, the secondary battery pack is configured as a floor liner that lines a floor of the cargo space. These and other features are discussed in greater detail in the following paragraphs of this detailed description.

Figure 1:
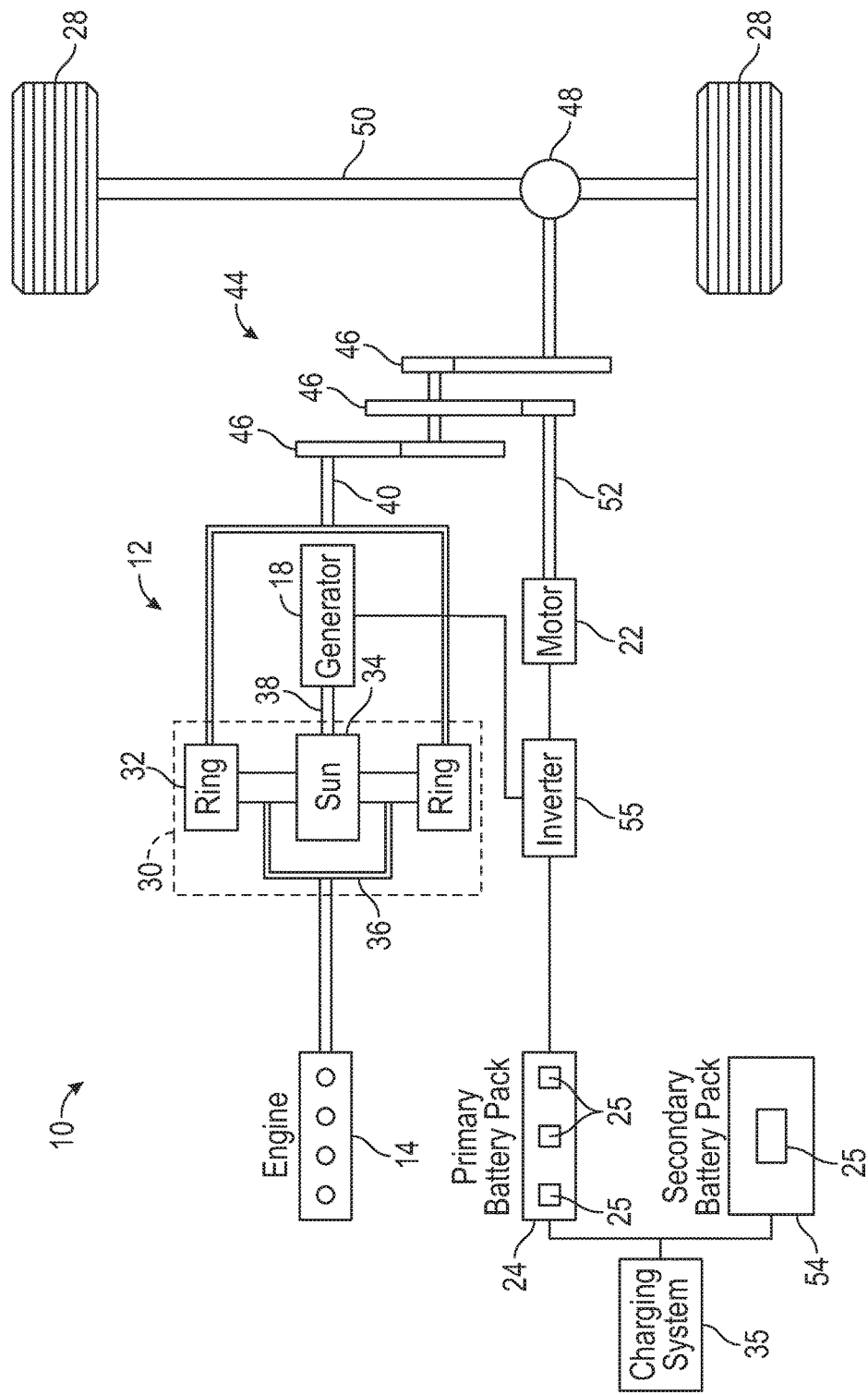
FIG. 1 schematically illustrates a powertrain of an electrified vehicle.

FIG. 1 schematically illustrates a powertrain 10 for an electrified vehicle 12. Although depicted as a plug-in hybrid electric vehicle (PHEV), it should be understood that the concepts described herein are not limited to PHEVs and could extend to other electrified vehicles, including, but not limited to, battery electric vehicles (BEVs), hybrid electric vehicles (HEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, a primary battery pack 24, and a secondary battery pack 54. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the primary battery pack 24.

The primary battery pack 24 is an exemplary electrified vehicle battery. The primary battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

The secondary battery pack 54 may be an additional high voltage traction battery provided on the electrified vehicle 12. The secondary battery pack 54 can be connected either in parallel or in series relative to the primary battery pack 24. Like the primary battery pack 24, the secondary battery pack 54 is capable of outputting electrical power for propelling the wheels 28. As discussed in greater detail below, the secondary battery pack 54 may include one or more battery arrays 25.

The primary battery pack 24, the secondary battery pack 54, and the generator 18 may be electrically connected over a high voltage bus through an inverter 55. The inverter 55, which may be an inverter system controller (ISC), supports bidirectional power flow within the powertrain 10 by converting direct current from the primary battery pack 24 and/or the secondary battery pack 54 to alternating current for powering the motor 22 or generator 18, or may alternatively convert alternating current from the motor 22 and/or generator 18 to direct current for charging the primary battery pack 24 and/or the secondary battery pack 54.

The electrified vehicle 12 may also be equipped with a charging system 35 for charging the energy storage devices (e.g., battery cells) of the primary battery pack 24 and the secondary battery pack 54. The charging system 35 may include charging components that are located both onboard the electrified vehicle 12 and external to the electrified vehicle 12. The charging system 30 can be connected to an external power source for receiving and distributing power received from the external power source throughout the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the primary battery pack 24 state of charge up to its maximum allowable discharging rate under certain driving patterns/cycles. The EV mode is an example of a charge depleting mode of operation for the electrified vehicle 12. During EV mode, the state of charge of the primary battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the primary battery pack 24 at a constant or approximately constant level by increasing the engine 14 propulsion. The electrified vehicle 12 may be operated in other operating modes in addition to the EV and HEV modes within the scope of this disclosure.

Figure 2:
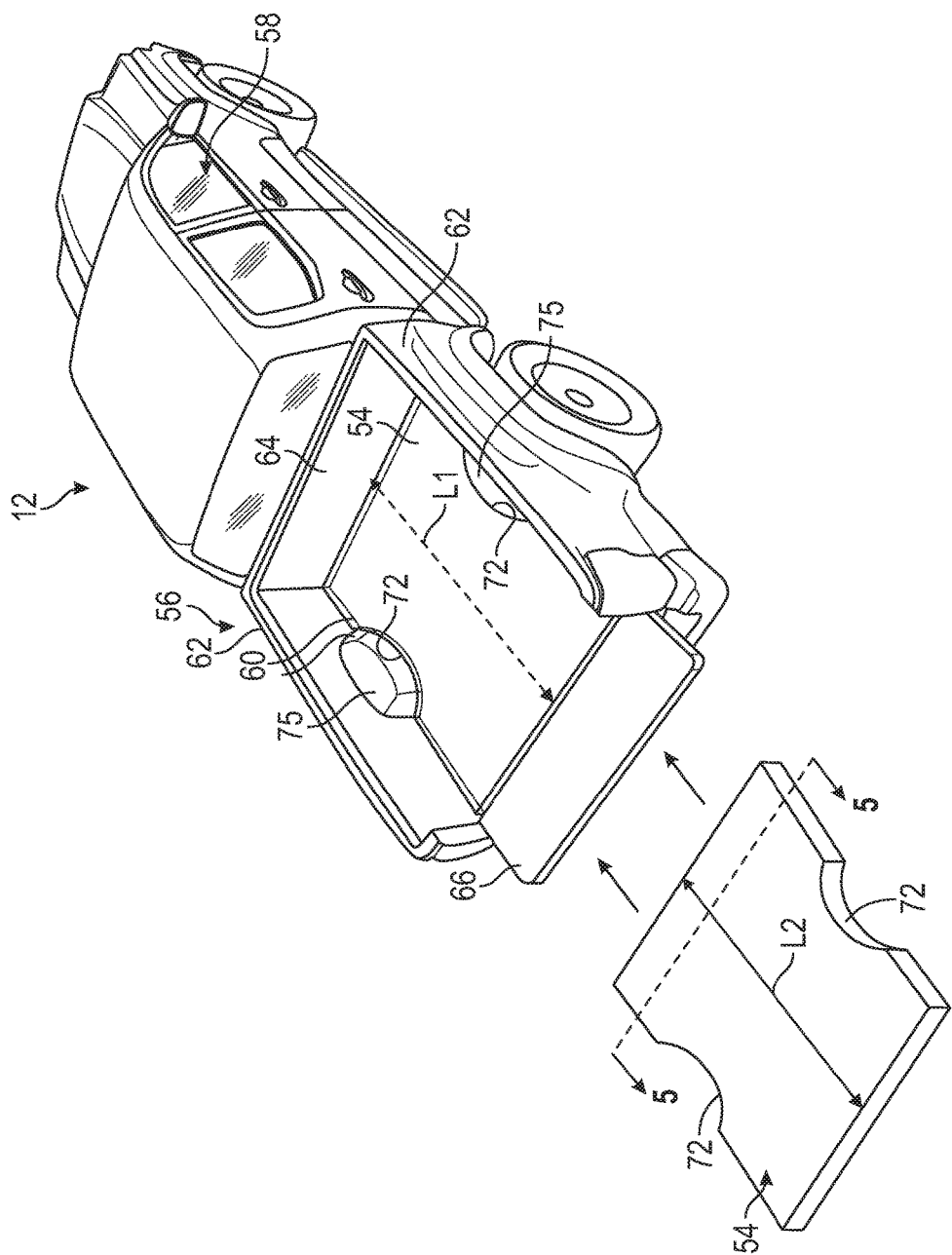
FIG. 2 illustrates an electrified vehicle that may employ the powertrain of FIG. 1. The electrified vehicle is equipped with a secondary battery pack.

FIG. 2 illustrates an electrified vehicle 12 that may employ the powertrain 10 shown in FIG. 1 or any other electrified or hybridized powertrain. In an embodiment, the electrified vehicle 12 is a pickup truck. Although a specific component relationship is illustrated in the figures of this disclosure, the illustrations are not intended to limit this disclosure. The placement and orientation of the various components of the electrified vehicle 12 are shown schematically and could vary within the scope of this disclosure. In addition, the various figures accompanying this disclosure are not necessarily to scale, and some features may be exaggerated or minimized to show certain details of a particular component.

The electrified vehicle 12 includes a truck bed 56 that establishes a cargo space for storing and hauling cargo at a rear location of the electrified vehicle 12. The truck bed 56 is generally rearward of a passenger cabin 58 of the electrified vehicle 12 and includes a floor 60 extending between a pair of longitudinally extending side walls 62, a laterally extending front wall 64, and a tailgate 66. The tailgate 66 is moveable between a closed position (not shown) and a deployed or open position. When in the closed position, the tailgate 66 generally encloses an end of the truck bed 56 that is opposite from the front wall 64 to prevent cargo from sliding out of the truck bed 56. When in the open position, the tailgate 66 is generally horizontal and thus parallel to ground level such that cargo can be loaded onto or unloaded from the truck bed 56.

The secondary battery pack 54 may be removably positioned on top of the floor 60 of the truck bed 56. In an embodiment, the secondary battery pack 54 is shaped like, and therefore disguised as, a floor liner that lines the floor 60. Disguising the secondary battery pack 54 as a floor liner gives the customer the option to add additional electric range to the electrified vehicle 12 without sacrificing a significant amount of cargo space.

In an embodiment, the secondary battery pack 54 optionally includes a cut-out portion 72 formed at each opposing side of the secondary battery pack 54. The cut-out portions 72 aid in positioning the secondary battery pack 54 around wheel wells 75 that may protruded into the truck bed 56.

The floor 60 of the truck bed 56 may include a first length L1 that extends from the front wall 64 to the tailgate 66 (when closed), and the secondary battery pack 54 may include a second length L2. In an embodiment, the second length L2 is about equal to the first length L1 (i.e., the second length L2 may be just slightly smaller than first length L1 for easily sliding the secondary battery pack 54 into the truck bed 56). However, embodiments are also contemplated in which the second length L2 of the secondary battery pack 54 is less than the first length L1 of the floor 60 such that the secondary battery pack 54 only lines a portion of the floor 60 of the truck bed 56.

Referring now to FIGS. 2 and 3, at least a portion of a bottom surface 70 of the secondary battery pack 54 directly contacts the floor 60 of the truck bed 56 in the installed position of the secondary battery pack 54. The truck bed 56 may include a first depth D1, and the secondary battery pack 54 may include a second depth D2 that is smaller than the first depth D1. The second depth D2 is relatively shallow compared to the first depth D1, and thus the secondary battery pack 54 does not significantly reduce the amount of available cargo space of the truck bed 56. Cargo 85 may be positioned on top of the secondary battery pack 54 for storing the cargo 85 within the truck bed 56.

Referring now primarily to FIG. 4, the floor 60 of the truck bed 56 may include one or more channels 86. Each channel 86 may include one or more openings 88 that extend through a floor of the channel 86. Cooling airflow may enter the channels 86 from underneath the electrified vehicle 12 through the openings 88 for air cooling the bottom surface 70 of the secondary battery pack 54. In other embodiments, the cooling airflow could enter from above or from the sides (via air scoops or aerodynamics) of the electrified vehicle 12. In still other embodiments, the secondary battery pack 54 could be liquid cooled or cooled using conductive fins mounted underneath the truck bed 56.

FIG. 5 illustrates additional features of the exemplary secondary battery pack 54. FIG. 5 is a cross-sectional view of the secondary battery pack 54 for visualizing its internal contents.

The secondary battery pack 54 houses a plurality of battery cells 68 that store energy for powering various electrical loads of the electrified vehicle 12. The secondary battery pack 54 could employ any number of battery cells within the scope of this disclosure. Thus, this disclosure is not limited to the exact configuration shown in FIG. 5.

The battery cells 68 may be stacked side-by-side (see FIG. 5B) to construct a grouping of battery cells 68, sometimes referred to as a "cell stack" or "cell array." In an embodiment, the battery cells 68 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 68, along with any support structures (e.g., array frames, spacers, rails, walls, plates, bindings, etc.), may collectively be referred to as a battery array or battery assembly. The secondary battery pack 54 depicted in FIG. 5 includes a first battery array 25A and a second battery array 25B that is side-by-side with the first battery array 25A. Although the secondary battery pack 54 of FIG. 5 is depicted as having a two battery arrays, the secondary battery pack 54 could include a greater or fewer number of battery arrays and still fall within the scope of this disclosure.

In an embodiment, the first battery array 25A and the second battery array 25B are irremovable from the secondary battery pack 54. In another embodiment, the first battery array 25A and the second battery array 25B are modular battery array units that are removable from the secondary battery pack 54. In such a modular design, the customer can customize the secondary battery pack 54 to provide a desired amount of additional electric range. An exemplary modular secondary battery pack could include up to six battery arrays, for example. The modular battery arrays can be removed and charged or could be charged while mounted inside the secondary battery pack 54.

An enclosure 74 houses each battery array 25A, 25B of the secondary battery pack 54. In an embodiment, the enclosure 74 is shaped like a floor liner in order to disguise the secondary battery pack 54 as the floor liner of the truck bed 56. In another embodiment, the enclosure 74 is a water-proof structure constructed of a polymer-based material, a metallic material, or a combination of polymer-based and metallic materials. The enclosure 74 may include any material or combinations of materials that are durable enough to enable cargo to be stacked on top of the secondary battery pack 54. It should be understood that the actual size, shape, and material make-up of the enclosure 74 is not intended to limit this disclosure.

FIG. 6, with continued reference to FIGS. 1-5, illustrates a connection system 76 for electrically connecting the secondary battery pack 54 to a high voltage circuit 78 of the electrified vehicle 12. The connection system 76 may include a vehicle-side connector 80 and a battery-side connector 82. In an embodiment, the vehicle-side connector 80 includes a flexible plug 96 that can be routed between a rear wall 97 of the passenger cabin 58 and the front wall 64 of the truck bed 56, and the battery-side connector 82 is a fixed connector that is recessed within a rear wall 84 of the enclosure 74 of the secondary battery pack 54. In this embodiment, the vehicle-side connector 80 is a male connector and the battery-side connector 82 is a female connector, although an opposite configuration is also contemplated. The vehicle-side connector 80 may be plugged into the battery-side connector 82 to connect the secondary battery pack 54 to the high voltage circuit 78.

In an embodiment, the vehicle-side connector 80 is routed between the rear wall 97 of the passenger cabin 58 and the front wall 64 of the truck bed 56 and is then passed through the front wall 64 and into the truck bed 56. In another embodiment, as shown in phantom, the vehicle-side connector 80 may be routed between the rear wall 97 and the front wall 64 and then routed over top of the front wall 64 and then into the truck bed 56 for connection to the battery-side connector 82.

In an alternative embodiment, the secondary battery pack 54 may be connected to and directly powered by the high voltage circuit 78 rather than by using a traditional plug-in approach.

Figure 7:
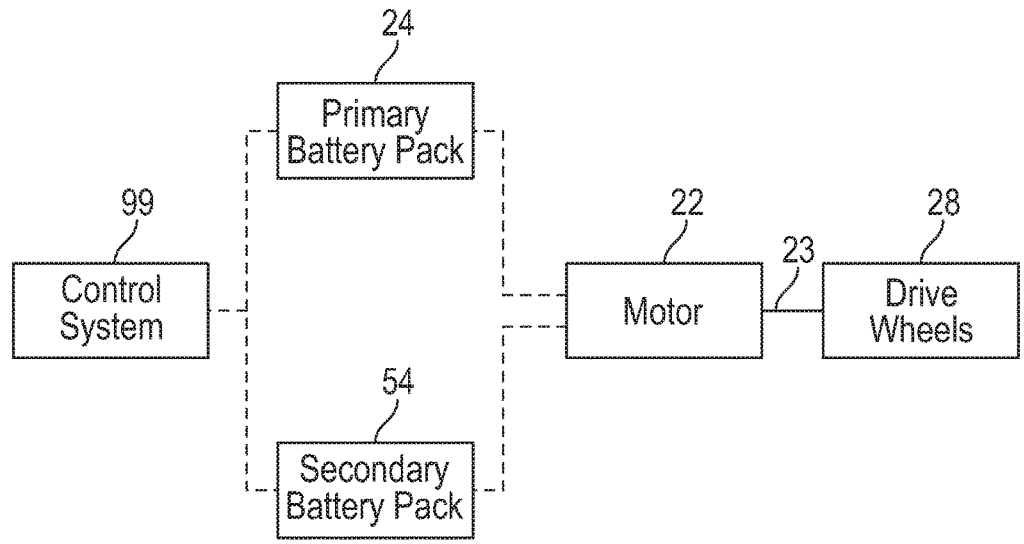
FIG. 7 illustrates an electric drive system according to a first embodiment of this disclosure.
Figure 8:
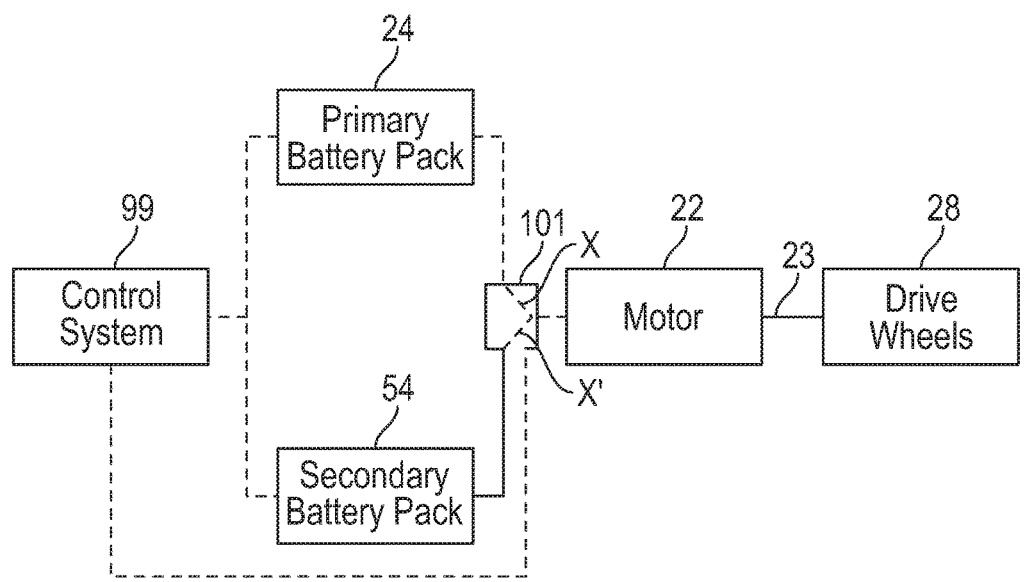
FIG. 8 illustrates an electric drive system according to a second embodiment of this disclosure.

Referring now to FIGS. 7 and 8, the primary battery pack 24 and the secondary battery pack 54 can be controlled such that both packs output power for powering the motor 22 of the electrified vehicle 12. The motor 22 outputs torque for propelling the one or more drive wheels 28 of the electrified vehicle 12. The motor 22 may be mounted on an axle 23, which may be a front axle, rear axle, or both.

As shown in FIG. 7, the primary battery pack 24 and the secondary battery pack 54 can be controlled by a control system 99 to provide power to the motor 22 in parallel. The control system 99 includes electronics, software, or both, for performing the necessary control functions for outputting power from the primary battery pack 24 and/or the secondary battery pack 54. Although shown as a single hardware device, the control system 99 could include multiple controllers in the form of multiple hardware devices, or multiple software controllers within one or more hardware devices. In an embodiment, the control system 99 is programmed to control how much power is outputted by each of the primary battery pack 24 and the secondary battery pack 54 during electric-only operating modes of the electrified vehicle 12.

In another embodiment, shown in FIG. 8, the control system 99 controls operation of a switch 101 for providing power from either the primary battery pack 24 or the secondary battery pack 54. For example, the control system 99 may command the switch 101 to a first position X when power from only the primary battery pack 24 is desired, or to a second position X' when power from the secondary battery pack 54 is desired. In an embodiment, the control system 99 automatically commands the switch 101 to the second position X' when the state of charge of the primary battery pack 24 falls below a predefined threshold.

Figure 9:
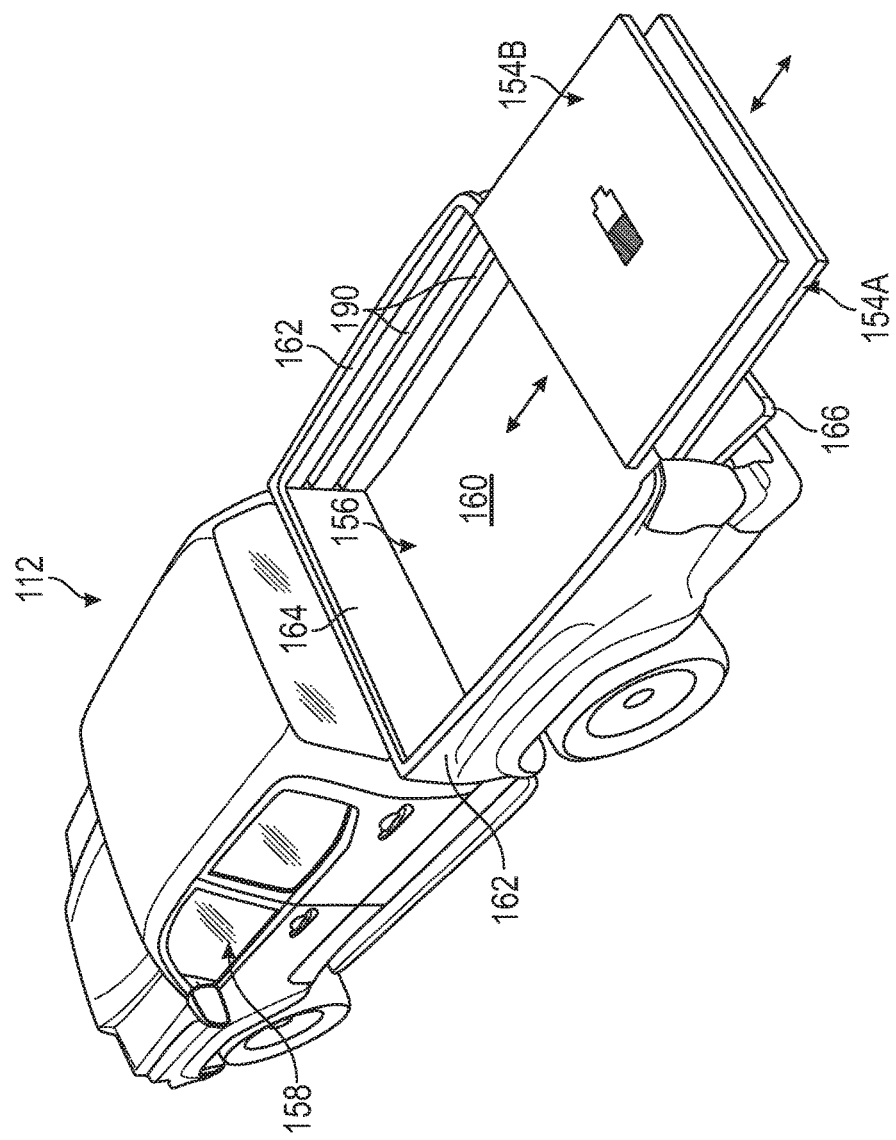
FIG. 9 illustrates another electrified vehicle equipped with two or more secondary battery packs.

FIG. 9 illustrates another exemplary electrified vehicle 112 that may employ the powertrain 10 shown in FIG. 1 or any other electrified or hybridized powertrain. In an embodiment, the electrified vehicle 112 is a pickup truck.

The electrified vehicle 112 includes a truck bed 156 that establishes a cargo space for storing and hauling cargo at a rear location of the electrified vehicle 112. The truck bed 156 is generally rearward of a passenger cabin 158 of the electrified vehicle 112 and includes a floor 160 extending between a pair of longitudinally extending side walls 162, a laterally extending front wall 164, and a tailgate 166.

Two or more secondary battery packs 154 may be removably positioned within the truck bed 156. In an embodiment, a first secondary battery pack 154A may be removably positioned over top of the floor 160 of the truck bed 156, and a second secondary battery pack 154B may be removably positioned over top of the first secondary battery pack 154A. Depending on the electric range needs of the customer, additional secondary battery packs 154 could be stacked on top of the first and second secondary battery packs 154A, 154B to increase the electric range of the electrified vehicle 112.

In an embodiment, longitudinal slots 190 may be formed within each of the side walls 162 of the truck bed 156. The longitudinal slots 190 establish channels for guiding the secondary battery packs 154 into place within the truck bed 156. For example, the secondary battery packs 154 may be slid into installed positions by guiding the secondary battery packs 154 within the longitudinal slots 190.

The secondary battery packs of this disclosure provide customers with the ability to selectively increase the vehicle's electric travel range without sacrificing cargo space. The secondary battery packs may be integrated into existing vehicle spaces and are removable for simplifying repair or replacement.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a drive wheel;
   a cargo space;
   a secondary battery pack positioned against a floor of the cargo space and adapted to selectively supply power for propelling the drive wheel,
   wherein the secondary battery pack is configured as a floor liner that lines at least a portion of the floor; and
   a connection system for electrically connecting the secondary battery pack to a high voltage circuit of the electrified vehicle,
   wherein the connection system includes a vehicle-side connector and a battery-side connector,
   wherein the vehicle-side connector includes a flexible plug that extends between a rear wall of a passenger cabin and a front wall of the cargo space.

2. The electrified vehicle as recited in claim 1, wherein the electrified vehicle is a pickup truck.

3. The electrified vehicle as recited in claim 2, wherein the cargo space is established by a truck bed of the pickup truck.

4. The electrified vehicle as recited in claim 1, wherein a bottom surface of the secondary battery pack is contiguous with the floor of the cargo space.

5. The electrified vehicle as recited in claim 1, wherein the secondary battery pack includes an enclosure that houses at least one battery array.

6. The electrified vehicle as recited in claim 1, wherein the flexible plug extends through the front wall.

7. The electrified vehicle as recited in claim 1, comprising a primary battery pack adapted to selectively supply power for propelling the drive wheel.

8. An electrified vehicle, comprising:
   a drive wheel;
   a cargo space;
   a secondary battery pack positioned within the cargo space and adapted to selectively supply power for propelling the drive wheel,
   wherein the secondary battery pack is configured as a floor liner that lines at least a portion of a floor of the cargo space; and
   a second secondary battery pack positioned over top of the secondary battery pack,
   wherein the secondary battery pack and the second secondary battery pack are received within longitudinal slots formed in longitudinally extending side walls of the cargo space.

9. The electrified vehicle as recited in claim 1, wherein the cargo space includes a first depth and the secondary battery pack includes a second depth that is shallower than the first depth.

10. The electrified vehicle as recited in claim 1, wherein the floor of the cargo space includes a channel configured to communicate a cooling airflow between a bottom surface of the secondary battery pack and the floor.

11. A method, comprising:
    lining a floor of a cargo space of an electrified vehicle with a secondary battery pack that is configured as a floor liner that directly contacts the floor of the cargo space,
    wherein the secondary battery pack is received within longitudinal slots formed in longitudinally extending side walls of the cargo space; and
    selectively propelling a wheel of the electrified vehicle using power from the secondary battery pack.

12. The method as recited in claim 11, comprising selectively propelling the wheel of the electrified vehicle using power from a primary battery pack of the electrified vehicle.

13. A method, comprising:
    lining a floor of a cargo space of an electrified vehicle with a secondary battery pack that is configured as a floor liner; and
    selectively propelling a wheel of the electrified vehicle using power from the secondary battery pack only when a state of charge of a primary battery pack of the electrified vehicle falls below a threshold level.

14. A method, comprising:
    lining a floor of a cargo space of an electrified vehicle with a secondary battery pack that is configured as a floor liner; and
    selectively propelling a wheel of the electrified vehicle using power from the secondary battery pack,
    wherein lining the floor of the cargo space includes sliding the secondary battery pack within longitudinal slots formed in longitudinally extending side walls of the cargo space.

15. The method as recited in claim 11, comprising positioning a second secondary battery pack over top of the secondary battery pack.

16. The electrified vehicle as recited in claim 1, wherein the cargo space is an exterior cargo space that is external to a passenger cabin of the electrified vehicle.

* * * * *